No. 766,573. PATENTED AUG. 2, 1904.
L. F. ADT.
EYEGLASSES.
APPLICATION FILED AUG. 29, 1903.
NO MODEL.

No. 766,573. Patented August 2, 1904.

UNITED STATES PATENT OFFICE.

LEO F. ADT, OF TROY, NEW YORK.

EYEGLASSES.

SPECIFICATION forming part of Letters Patent No. 766,573, dated August 2, 1904.

Application filed August 29, 1903. Serial No. 171,278. (No model.)

*To all whom it may concern:*

Be it known that I, LEO F. ADT, of Troy, in the county of Rensselaer and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, and has for its object to produce a spring having lens-attaching devices and nose guards or clamps formed integrally therewith, the parts thereof being so formed and arranged that the distance of the spring-arms both inwardly and rearwardly of the lenses may be varied or adjusted to any desired degree.

Furthermore, it is an object of my invention to provide a novel method of forming the guards on the spring whereby a resilient action thereof is secured and an adjustment provided.

To these and other ends my invention consists in certain features of novelty and advantage, as will be hereinafter more fully explained, and pointed out in the claims hereunto annexed.

Figure 1:
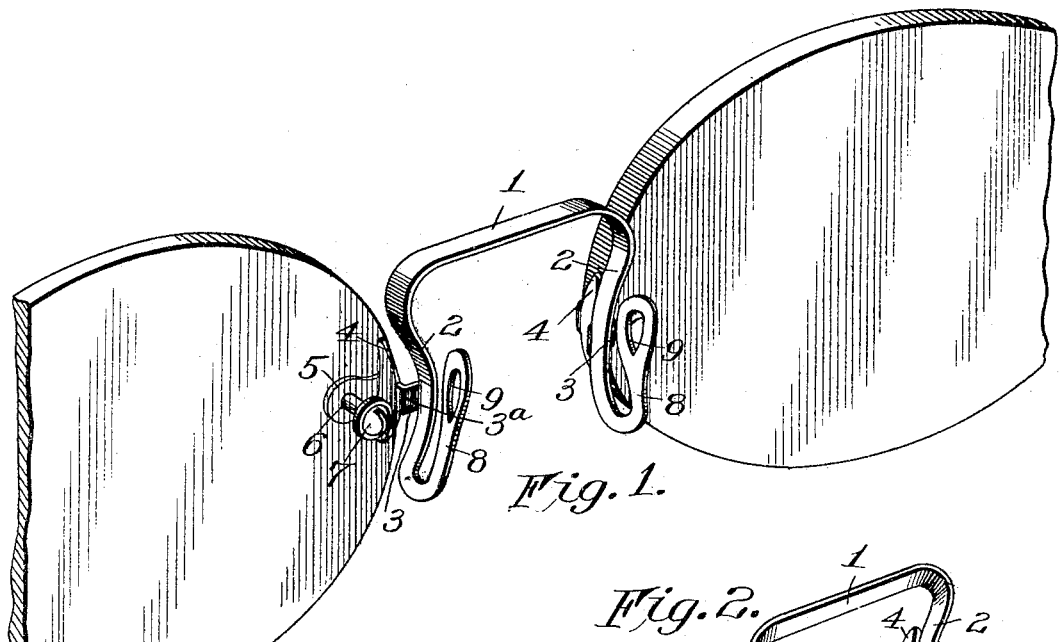
Figure 2:
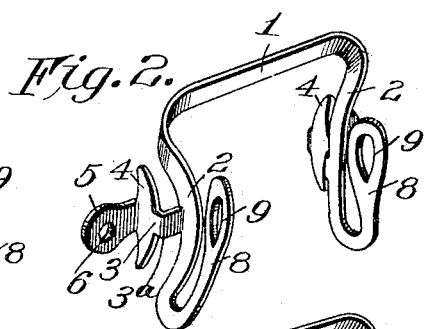
Figure 4:
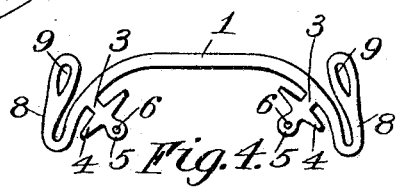
Figure 5:
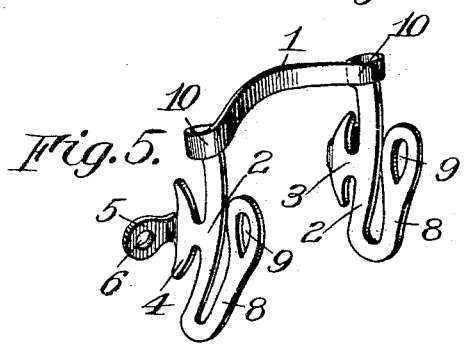
Figure 3:
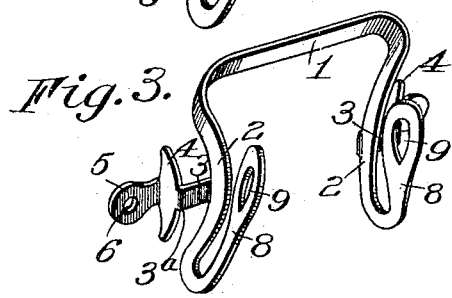
Figure 6:
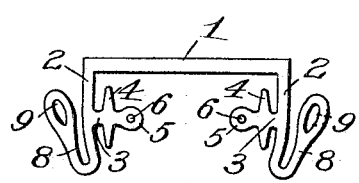

In the drawings, Figure 1 is a perspective view of an eyeglass embodying my said invention. Figs. 2 and 3 are similar views showing modified forms of the same with the lenses detached. Fig. 4 is a view of a blank similar to that from which the forms shown in Figs. 1 to 3, inclusive, are made. Fig. 5 is a view of a modified form of spring, and Fig. 6 is a view of a blank from which said form is made.

The same numerals of reference designate similar parts in the several views.

In Figs. 1 to 4, inclusive, are shown one embodiment of my invention, wherein 1 designates the central portion of the spring, from which extend the downwardly-disposed arms 2 2, preferably bowing inwardly and rearwardly, as shown, and having a forwardly-extending arm 3 connected thereto at points intermediate their ends, and carried by these arms 3 3 are the ears 4 4, adapted to engage the inner edge of the lens and the lugs or ears 5 5, perforated, as at 6 6, to receive the screws 7 7, passing through the lenses and securing said ears thereto. In the present embodiment of my invention the lower extremities of the arms 2 2 are bent rearwardly and doubled upwardly to form guards or nose-clamps 8 8, the bearing-surfaces of which are preferably enlarged and, if desired, may be perforated, as at 9, to afford a firm grip upon the flesh of the nose. By forming the guards in this manner it will be obvious that a resilient action thereof is secured and an adjustment provided, as said guards are divided or separated from the relatively fixed arms 2 2 and are free to be moved or adjusted in any desired relative positions.

In the several embodiments of my invention the central portion 1 of the spring may be so disposed as to present the flat surface thereof in substantially a horizontal plane, causing the guards to be separated when the extremities of the lenses are tilted upwardly, or, if preferred, said spring may be so formed that the central portion thereof will present its flat surface in a plane substantially parallel with the the plane of the lenses, and thereby cause the guards lying in rear thereof to separate when the extremities of the lenses are bent forwardly. In order to increase the resilient action of the spring, a form similar to that shown in Fig. 5 may be adopted, wherein one or more coils or bends 10 10 are formed in the spring between the central portion thereof and the arms 2 2 and so disposed that a forward motion of the extremities of the lenses will also cause a bending action to take place in said coils, tending to produce an outward motion of the guards located immediately in rear thereof. Such a spring may be formed from a blank similar to that shown in Fig. 6, the arms 2 2 being bent forwardly, inwardly, rearwardly, and thence outwardly to form said coils, the arms of which preferably lie in substantially a horizontal plane.

In order to meet the requirements of various conditions, the length of the arms 3 3 between the spring-arms 2 2 and the lens-attaching portions 4 5 may be varied as desired to insure a proper adjustment of the device by the optician. For instance, when the arms 2 2 of the spring are to be relatively close or set in from the inner edges of the lenses said arms 3 3 are made comparatively long and a bend $3^a$ formed therein adjacent the shoes 4 4 or at a point intermediate the spring-arms 2 2 and the shoes to give the proper adjustment. The relative position of the spring and guards in rear of the lenses may also be varied by the length of the arms 3 3 or by the position of the bend $3^a$ therein, and in cases where the distance of the parts in rear of the lenses and the relative distance between the spring-arms 2 2 is approximately fixed the arms 3 3 may be formed comparatively short, as shown in the form illustrated in Fig. 5. However, it will be understood that I do not restrict myself to the precise details shown, as they may be modified or varied to any desired degree to secure a proper fitting of the device upon the nose.

A spring formed in accordance with my invention will eliminate the necessity of screws or other adjustable devices for holding the parts in position, as the entire spring, guards, and lens-attaching devices are formed integrally, and by forming the spring in the manner described the arms 2 2 thereof, as well as the central portion and the guards, will bear upon the nose of the wearer, insuring a firm and proper seating of the device. As the guards are capable of adjustment to the desired degree, and as the arms 2 2 of the spring are adjustable relatively the lenses and to each other, it will be obvious that a wide range of adjustment is provided, enabling the optician to accurately fit the device to conform to the characteristics of different noses.

In the embodiment shown in Figs. 2 and 3 it will be seen that the central portion 1 of the spring and the surfaces of the arms 3 3 and attaching-clips 5 5 are disposed in substantially a vertical plane or planes substantially parallel to the plane of the lenses, the result being that forces tending to lift the lenses upwardly in a vertical plane are effectually resisted, the motion of the lenses necessarily being in a horizontal plane to produce a maximum separation of the guards should this form be employed. Moreover, it enables the mounting to be formed from a blank wherein the central spring portion and the arms 3 3, carrying the lens-attaching devices, will extend in parallel directions, and as the bending action is brought to bear mainly upon these portions when the lenses are manipulated in a direction substantially at right angles to the plane of the lenses the resiliency and strength of these parts may be materially increased by so punching or otherwise forming the blank from the material that the central portion 1 of the spring and the arms 3 3 extend substantially in the direction of greatest strength of the metal.

I claim as my invention—

1. In eyeglasses, a spring having arms extending downwardly from the central portion thereof and continued edgewise rearwardly and then upwardly to form guards, and having lens-attaching portions offset forwardly from the intermediate portion of the downwardly-extending arms of the spring.

2. In eyeglasses a spring having arms extending downwardly from the central portion and the guards at the ends thereof, and the lens-attaching portions offset bodily forwardly of the depending arms to carry the lenses out of the planes of said arms.

3. In eyeglasses a spring having the depending arms each extending rearwardly at their lower portion and then upwardly in substantially the same plane and both the arms and extensions adapted to bear upon the wearer's nose and the lens-attaching portions offset forwardly of the depending arms to hold the lenses out of the plane thereof.

4. An eyeglass-spring composed of flat metal embodying the connecting portion, the depending arms, the guards connected to the lower ends thereof and the arms extending forwardly from the depending arms, having the vertically-extending ears forward of the plane of the arms for engaging the edges of the lenses and the laterally-extending perforated lugs for engaging the faces of the lenses.

5. In eyeglasses, the combination with the lenses, of a spring formed of flat metal having the depending arms and the guards thereon, the central portion of the spring having its flat surfaces lying in a plane substantially parallel with that of the lenses, arms extending laterally from the forward edges of said depending arms and lens-holding lugs thereon located forward of the plane of the depending arms.

6. The herein-described eyeglass-mounting formed of flat metal bent to form the central connecting portion, the depending arms having their lower portions bent upwardly edgewise to form guards, the arms 3 extending forwardly from the depending arms, having the vertically-extending ears or lugs 4 and the laterally-extending perforated lugs 5 at the forward edge thereof.

7. The herein-described eyeglass-mounting formed of flat metal bent to form the central connecting portion, the depending arms having their lower portions bent up to form guards, the arms extending from the intermediate portion outwardly then forwardly and provided with the vertically-extending lugs or ears to engage the edges of the lenses, thence extending outwardly to form the lens-attaching lugs provided with perforations.

8. In eyeglasses, the combination with the lenses, of a mounting formed of a single piece of flat material and embodying a spring portion formed to yield or bend in a direction substantially perpendicular to the plane of the lenses, and having the depending portions, the outwardly-extending arms attached to the depending portions having their flat surfaces extending in planes substantially parallel to that of the lenses, and the lens-attaching devices carried by the said arms.

9. In eyeglasses, the combination with the lenses, of a mounting formed of a single piece of flat material and embodying a spring the central portion of which has its flat surfaces lying in a plane substantially parallel to that of the lenses, the depending portions extending downwardly edgewise of the central portion of the spring, the outwardly-extending arms attached to the depending portions having their flat surfaces extending in planes substantially parallel to that of the lenses, and lens-attaching devices carried by the said arms.

10. The herein-described eyeglass-mounting adapted to be made in a single piece from a blank of sheet material embodying a central spring portion, the depending portions extending in a direction edgewise of the central portion, the arms extending edgewise of the depending portions and in directions substantially parallel to that of the central portion of the spring, and the attaching devices formed upon the said arms.

LEO F. ADT.

Witnesses:
WM. SHAW,
K. BELLE KELLY.